United States Patent
Dinesen et al.

(10) Patent No.: US 8,061,147 B2
(45) Date of Patent: Nov. 22, 2011

(54) MAGNETIC REGENERATOR, A METHOD OF MAKING A MAGNETIC REGENERATOR, A METHOD OF MAKING AN ACTIVE MAGNETIC REFRIGERATOR AND AN ACTIVE MAGNETIC REFRIGERATOR

(75) Inventors: Anders Reves Dinesen, Copenhagen (DK); Soren Linderoth, Roskilde (DK); Nini Pryds, Dragor (DK); Anders Smith, Birkerod (DK)

(73) Assignee: The Technical University of Denmark, Lyngby (DK)

( * ) Notice: Subject to any disclaimer, the term of this patent is extended or adjusted under 35 U.S.C. 154(b) by 924 days.

(21) Appl. No.: 11/795,034

(22) PCT Filed: Dec. 19, 2005

(86) PCT No.: PCT/EP2005/013654
§ 371 (c)(1),
(2), (4) Date: Mar. 12, 2008

(87) PCT Pub. No.: WO2006/074790
PCT Pub. Date: Jul. 20, 2006

(65) Prior Publication Data
US 2009/0113897 A1    May 7, 2009

Related U.S. Application Data

(60) Provisional application No. 60/642,984, filed on Jan. 12, 2005.

(51) Int. Cl.
*F25B 21/00* (2006.01)

(52) U.S. Cl. .................................. 62/3.1; 62/114

(58) Field of Classification Search .............. 62/3.1, 62/6, 114, 56, 467; 29/602.1, 890.035; 165/4, 165/104.11; 361/133
See application file for complete search history.

(56) References Cited

U.S. PATENT DOCUMENTS

| | | | |
|---|---|---|---|
| 3,097,929 A | | 7/1963 | Ragan |
| 4,332,135 A | | 6/1982 | Barclay |
| 4,388,131 A | | 6/1983 | Unger |
| 4,408,463 A | * | 10/1983 | Barclay ............................ 62/3.1 |
| 4,674,288 A | * | 6/1987 | Kuriyama et al. ............... 62/3.3 |
| 5,465,781 A | * | 11/1995 | DeGregoria ....................... 165/8 |
| 5,934,078 A | * | 8/1999 | Lawton et al. ................... 62/3.1 |

(Continued)

FOREIGN PATENT DOCUMENTS
GB       661738       10/1949
(Continued)

OTHER PUBLICATIONS

International Search Report for PCT/EP2005/013654, Mar. 8, 2006, 5 pages.

(Continued)

*Primary Examiner* — Mohammad Ali
(74) *Attorney, Agent, or Firm* — Pillsbury Winthrop Shaw Pittman LLP

(57) ABSTRACT

The invention provides a method of making a magnetic regenerator for an active magnetic refrigerator, the method comprising: forming a magnetic regenerator from a slurry or a paste containing a magnetocaloric material the magnetic regenerator being formed to have plural paths therethrough for the flow of a heat transfer fluid; and varying the composition of the magnetocaloric material so that the magnetic transition temperature of the magnetic regenerator varies along the paths.

17 Claims, 5 Drawing Sheets

U.S. PATENT DOCUMENTS

| | | | |
|---|---|---|---|
| 6,293,106 B1 * | 9/2001 | Acharya et al. | 62/3.1 |
| 6,415,611 B1 * | 7/2002 | Acharya et al. | 62/3.1 |
| 6,425,250 B1 * | 7/2002 | Acharya et al. | 62/6 |
| 6,467,274 B2 * | 10/2002 | Barclay et al. | 62/3.1 |
| 6,526,759 B2 * | 3/2003 | Zimm et al. | 62/3.1 |
| 6,668,560 B2 * | 12/2003 | Zimm et al. | 62/3.1 |
| 6,826,915 B2 * | 12/2004 | Wada et al. | 62/3.1 |
| 2002/0053209 A1 * | 5/2002 | Zimm et al. | 62/3.1 |
| 2003/0106323 A1 * | 6/2003 | Zimm et al. | 62/3.1 |
| 2004/0093877 A1 | 5/2004 | Wada | |
| 2004/0261420 A1 * | 12/2004 | Lewis | 62/3.1 |

FOREIGN PATENT DOCUMENTS

| | | |
|---|---|---|
| JP | 58-124178 | 7/1983 |
| JP | 2003-28532 | 1/2003 |
| WO | 00/26027 | 5/2000 |
| WO | 2004/059221 | 7/2004 |

OTHER PUBLICATIONS

Written Opinion of the International Search Authority for PCT/EP2005/013654, Mar. 8, 2006, 7 pages.

Hueso et al., "Tuning of the magnetocaloric effect in $La_{0.67}Ca_{0.33}MnO_{3-\delta}$ nanoparticles synthesized by sol-gel techniques", J. of Applied Physics, vol. 91, No. 12, Jun. 15, 2002, pp. 9943-9947.

Lin et al., "Magnetocaloric effect in $La_{0.80-x}Ca_{0.20}Sr_xMnO_3$ ($x$=0.05, 0.08, 0.10)", J. of Magnetism and Magnetic Materials, vol. 283, No. 2-3, Dec. 2004, pp. 375-379.

Japanese Office Action mailed Mar. 1, 2011 in corresponding Japanese Patent Application No. 2007-550702.

European Examination Report dated Mar. 8, 2011 in corresponding European Patent Application No. 05 818 789.9.

* cited by examiner

MAGNETIC REGENERATOR, A METHOD OF MAKING A MAGNETIC REGENERATOR, A METHOD OF MAKING AN ACTIVE MAGNETIC REFRIGERATOR AND AN ACTIVE MAGNETIC REFRIGERATOR

CROSS REFERENCE TO RELATED APPLICATIONS

This is the U.S. National Phase of PCT/EP2005/013654, filed Dec. 19, 2005, which in turn claims priority to U.S. provisional application No. 60/642,984 filed Jan. 12, 2005, both of which are incorporated herein in their entirety by reference.

The present invention relates to a magnetic regenerator, a method of making a magnetic regenerator, a method of making an active magnetic refrigerator and an active magnetic refrigerator.

In an active magnetic refrigerator, the active component is referred to as a magnetic regenerator and is formed of a magnetocaloric material, i.e. a material that heats up when placed in an applied magnetic field. Such materials have been known for a long time and it has been recognised that they could be used for cooling purposes. Specifically, an active magnetic refrigerator comprises a magnetic regenerator arranged between a hot-side heat exchanger and a cold-side heat exchanger. A source of magnetic field is also provided. A heat transfer fluid is arranged to flow back and forth from the cold-side heat exchanger to the hot-side heat exchanger through the magnetic regenerator in a cycle. A magnetic field is repeatedly applied to and removed from the magnetic regenerator, thereby causing it to heat up and cool down.

There are four stages to an active magnetic regenerator cycle. First, the application of a magnetic field warms the magnetic regenerator by the magnetocaloric effect, causing the heat transfer fluid within the regenerator to heat up. Second, heat transfer fluid flows in the direction from the cold-side heat exchanger to the hot-side heat exchanger. Heat is then released from the heat transfer fluid to the hot-side heat exchanger. Third, the magnetic regenerator is demagnetised, cooling the magnetocaloric material and the heat transfer fluid in the bed. Last, the heat transfer fluid flows through the cooled bed in the direction from the hot-side heat exchanger to the cold-side heat exchanger. The fluid takes up heat from the cold-side heat exchanger. The cold-side heat exchanger can then be used to provide cooling to another body or system.

Conventionally, metallic materials such as gadolinium are used as the magnetic regenerator since certain metallic materials are well known to exhibit the magnetocaloric effect. Usually, the regenerator comprises a porous bed of small metallic spheres. In use, a temperature gradient is established between the cold-side heat exchanger and the hot-side heat exchanger. The magnetic regenerator in combination with the heat transfer fluid enables heat to be "pumped" from the cold-side heat-exchanger to the hot-side heat exchanger.

It has been recognised that to improve the performance of an active magnetic regenerator, the active temperature range of the magnetic regenerator i.e., the temperature at which the material exhibits the magnetocaloric effect at a certain position along the flow path of the heat transfer fluid through the magnetic regenerator should coincide with the temperature of the regenerator at that position, i.e. correspond to the temperature on the temperature gradient at the actual position in the regenerator along the fluid path.

GB-A-661738 discloses a method and apparatus for magnetic refrigeration. An active magnetic refrigerator is provided having a magnetic regenerator formed of plates defining a flow path for a heat transfer fluid. The Curie temperature of the magnetic regenerator varies in the direction of the flow of the heat transfer fluid.

According to a first aspect of the present invention, there is provided a method of making a magnetic regenerator for an active magnetic refrigerator, the method comprising: forming a magnetic regenerator from a slurry or a paste containing magnetocaloric material the magnetic regenerator being formed to have plural paths therethrough for the flow of a heat transfer fluid; and varying the composition of the magnetocaloric material and/or the slurry or paste so that the magnetic transition temperature of the magnetic regenerator varies along the paths.

Preferably, the method comprises: forming a magnetic regenerator from a powder of a magnetocaloric material together with ancillary components such as binders and sintering aids, the magnetic regenerator being formed to have plural paths therethrough for the flow of a heat transfer fluid; and varying the composition of the material so that the magnetic transition temperature (e.g., the Curie temperature in the case of ferromagnetic materials) of the magnetic regenerator varies along the paths, and possibly along the direction perpendicular to the flow.

The magnetocaloric material may consist of metals, metal oxides, or ceramics, or a mixture of these. Preferably, the material is non-corroding, e.g. a ceramic material.

In certain embodiments, the invention provides a method of making a magnetic regenerator utilising shaping methods for powder materials in a slurry or paste, followed by drying and sintering; the sintering may take place under controlled time, temperature and atmospheric conditions, e.g. in a reducing or an oxidizing atmosphere. The sintering results in a solid object with a desired high density, which is mechanically stable and easy to handle. This method enables the composition and thus the magnetocaloric properties of the material easily to be varied continuously. Furthermore, it enables the magnetic regenerator to be made in such a way that the active temperature range of the regenerator at a certain point coincides with the temperature of a heat transfer fluid at that point.

In a preferred embodiment, the surface of the 'green' (unsintered) magnetocaloric component may be patterned or corrugated to increase the effective surface area, thus optimizing the heat transfer to the liquid. Furthermore, the sintering of the component ensures a mechanically stable and, in the case of ceramics, non-corroding component. Furthermore, the use of ceramic, non-corroding materials in the preferred embodiment ensures that the cost of making a magnetic regenerator is reduced in comparison to the cost of making a magnetic regenerator using conventional metal magnetocaloric materials. In addition, use of such materials avoids the corrosion issues connected with magnetocaloric metallic materials that are prone to corrosion from the heat transfer fluid.

According to a second aspect of the present invention, there is provided a method of making an active magnetic refrigerator, the method comprising: providing a magnetic regenerator manufactured according to the method of the first aspect of the present invention; providing a magnet to selectively apply and remove a magnetic field to the magnetic regenerator; and providing a heat transfer fluid driver, for driving a heat transfer fluid back and forth through the magnetic regenerator in synchronised manner as the magnetic field is applied and removed.

According to a third aspect of the present invention, there is provided a magnetic refrigerator, comprising: a magnetic regenerator comprising plural channels made of a magnetocaloric material through which in use a heat transfer fluid is made to flow back and forth through, wherein the magnetic transition temperature of the magnetocaloric material varies in the direction of flow of the heat transfer fluid.

According to a fourth aspect of the present invention, there is provided a magnetic regenerator comprising plural paths made of a magnetocaloric material through which in use a heat transfer fluid is made to flow back and forth, wherein the magnetic transition temperature of the magnetic regenerator varies along the paths.

Examples of the present invention will now be described in detail with reference to the accompanying drawings, in which.

Figure 1:
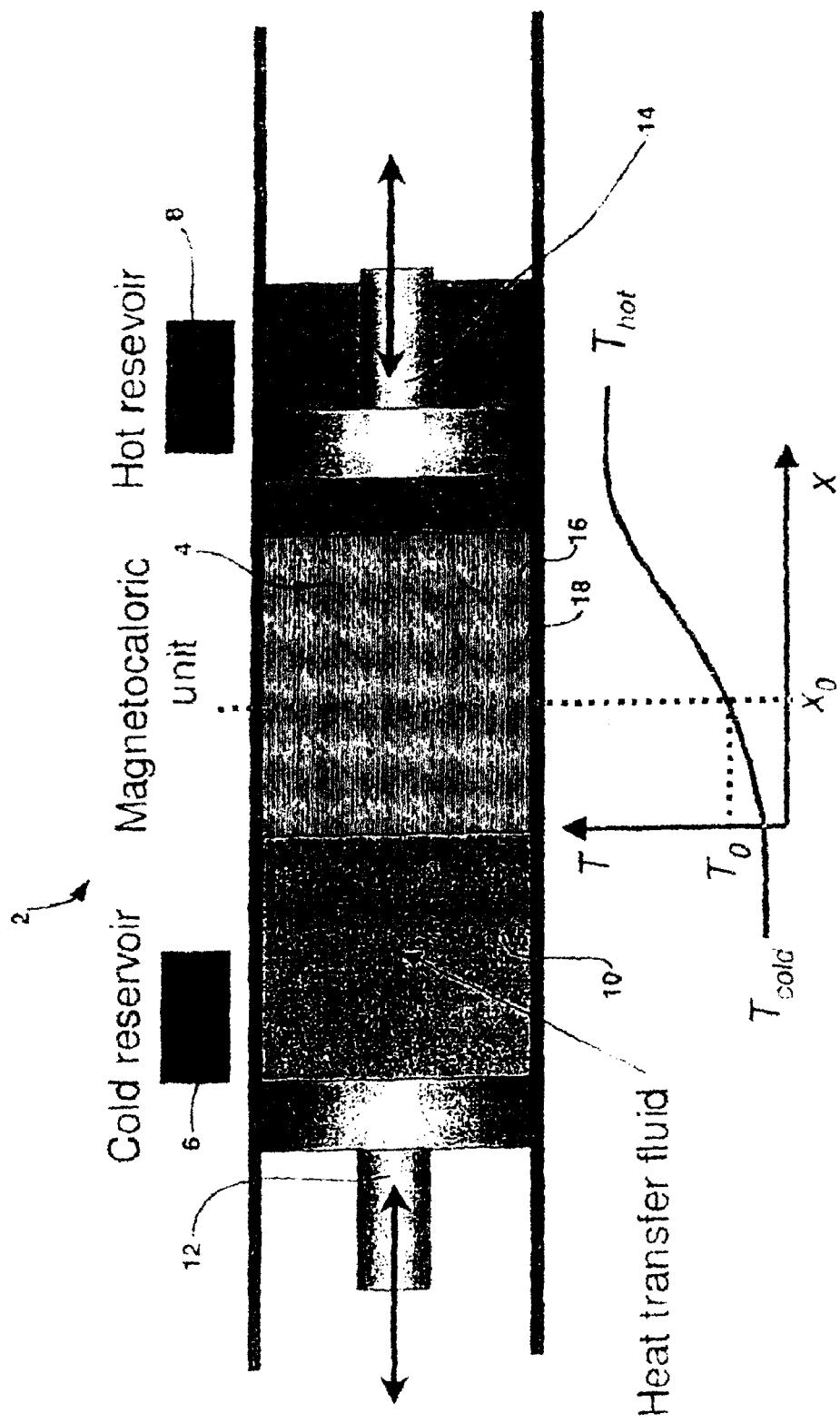
FIG. 1 shows a schematic representation of an example of a magnetic refrigerator according to an embodiment of the present invention.

FIG. 1 shows a schematic representation of an example of a magnetic refrigerator according to an embodiment of the present invention. The refrigerator comprises a magnetocaloric unit 4 arranged in thermal communication with each of a cold-side heat exchanger 6 and a hot-side heat exchanger 8. A heat transfer fluid 10 is provided for being forced back and forth through the magnetocaloric unit 4. In the example shown pistons 12 and 14 are provided for forcing the heat transfer fluid 10 through the magnetocaloric unit 4.

A magnet (not shown) is also provided for selectively applying a magnetic field to the magnetocaloric unit 4 and removing the magnetic field. The magnet may be a permanent magnet or an array of such magnets, an electromagnet or a solenoid. For low temperature applications the solenoid may be formed of superconductive material and be cooled by a cryogenic liquid such as liquid nitrogen.

In the specific example shown, a vertical section through the magnetocaloric unit is shown. The magnetocaloric unit 4 comprises plates 16 defining therebetween passages or paths 18 along which the heat transfer fluid flows.

Also shown in FIG. 1 is a graph of the variation of temperature of the magnetocaloric unit in the direction x, from the cold-side heat exchanger to the hot-side heat exchanger. A temperature gradient is established between the cold-side heat exchanger 6 and the hot-side heat exchanger 8. The temperature $T(x)$ at any position x varies between temperatures $T_{cold}$ and $T_{hot}$. In view of the recognised fact that the magnetocaloric effect of a material varies with temperature and is at a maximum at or near the magnetic transition temperature of the material, the plates are formed such that the magnetic transition temperature of the plates 16 within the magnetocaloric unit 4 varies in the direction between the cold-side heat exchanger 6 and the hot-side heat exchanger 8.

To optimise the performance of the refrigerator, the material used in the form of the magnetocaloric unit 4 is selected so that at the position $x_0$, the unit 4 has a maximum magnetocaloric effect at temperature $T_0$. This ensures that the maximum possible magnetocaloric effect is achieved by the device. As will be explained below, this may be achieved by controlling and/or varying the composition of the material or powder used to form the unit 4.

The material or materials used to form the plates 16 of the magnetocaloric unit 4 in the example shown in FIG. 1 may be non-corroding materials, i.e. they are materials that substantially do not corrode upon exposure to a liquid such as a heat transfer fluid. The use of ceramic materials is particularly preferred as this avoids the problem of corrosion connected with conventional use of metallic materials such as gadolinium in magnetic regenerators. In particular, where metals are used to form the magnetocaloric unit 4, corrosion of the magnetocaloric unit as a result of the flow of the heat transfer fluid may be a problem. Accordingly, in the example shown in FIG. 1, this problem is avoided.

In an example, two or more systems such as the one shown in FIG. 1 are arranged in parallel. A moveable permanent magnet is provided enabling the magnet to be utilised continuously. When one regenerator is demagnetised the magnet can be used to magnetise one of the others.

In use, initially, the magnetocaloric unit 4 is demagnetised. Upon application of a magnetic field, the temperature of the magnetocaloric unit 4 rises due to a decrease in magnetic entropy and a corresponding increase in thermal entropy of the magnetic regenerator. Heat transfer fluid within the magnetocaloric unit increases in temperature with the magnetocaloric unit 4. The pistons 12 and 14 are then actuated to move to the right thereby forcing heat transfer fluid 10 to the left of the magnetocaloric unit into the spaces between the plates 16 and the heat transfer fluid that is within the magnetocaloric unit and therefore heated due to the rise in temperature of the magnetocaloric unit towards the hot-side exchanger 8.

In other words, the heat transfer fluid that is initially within the magnetic regenerator and is heated upon application of the magnetic field is forced towards the hot-side heat exchanger where it gives up some of the heat it has gained as a result of the application of the magnetic field.

The magnetic field is then removed, e.g., by the switching off of an electromagnet or a solenoid used to generate the magnetic field. This causes an increase in magnetic entropy and a corresponding decrease in thermal entropy. The magnetocaloric unit 4 thereby reduces in temperature. The heat transfer fluid within the magnetocaloric unit 4 at this stage undergoes a similar temperature drop due to the drop in temperature of the magnetocaloric unit 4. As the pistons move towards the left (in FIG. 1) this cooled heat transfer fluid is then forced, by the pistons 12 and 14, towards the left hand side of the refrigerator (the actual configuration shown in FIG. 1) and the cold-side heat exchanger 6 where it can receive heat, e.g. from an article being cooled. The cycle can then be repeated.

Figure 2:
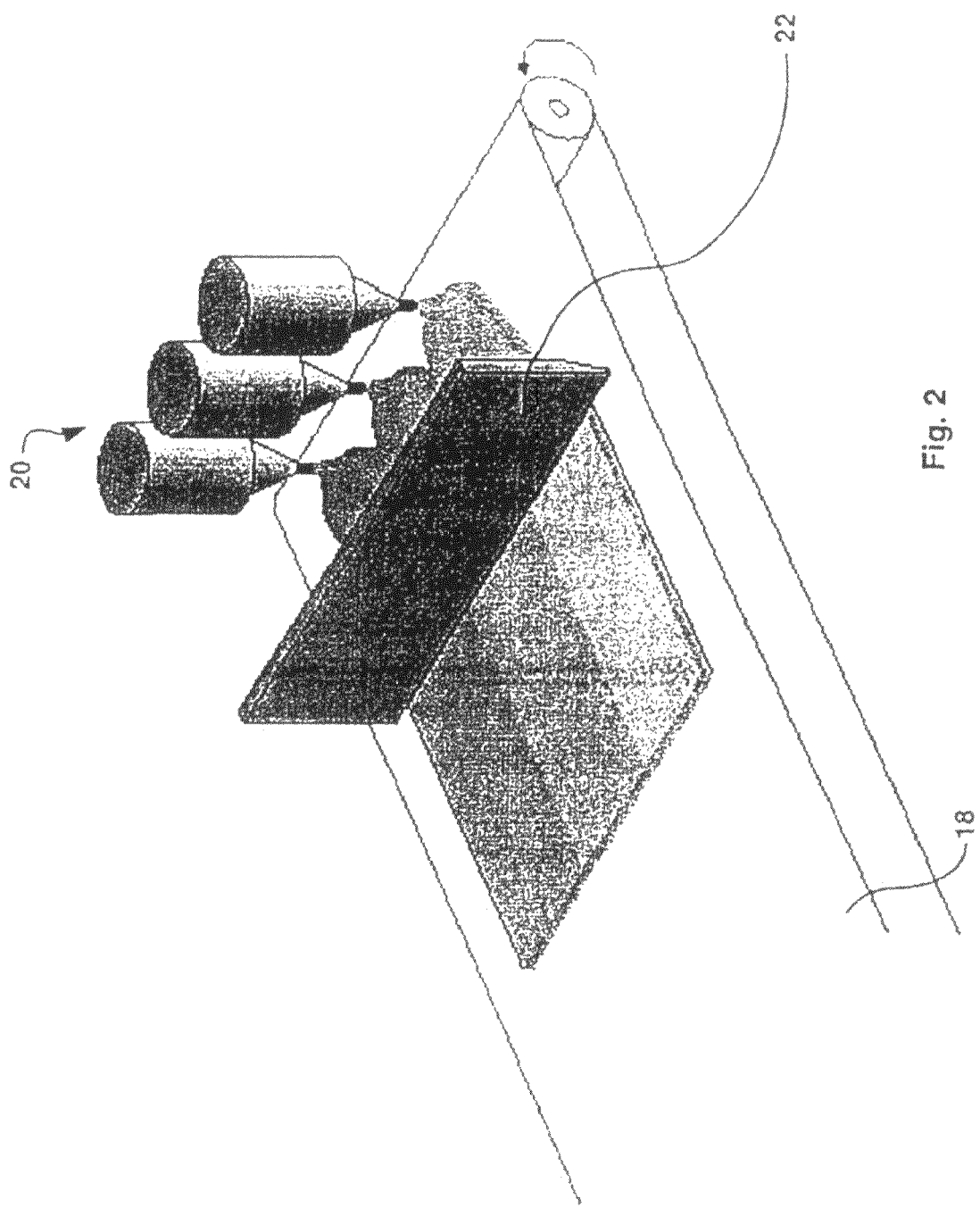
FIG. 2 shows a schematic representation of an example of a method of making a magnetic regenerator.

FIG. 2 shows a schematic representation of an example of a method of making a magnetic regenerator. The example shows a tape casting system comprising a conveyor belt 18 and a number of slurry or paste containers 20. Each of the slurry containers contains a composition of ceramic material(s) having a specifically determined magnetic transition temperature. The magnetic transition temperatures of the slurries increase monotonically from left to right in the slurry containers 20. In other words the slurry in the first container has a specific magnetic transition temperature $T_1$ and the slurry in each of the containers has its own magnetic transition temperature $T_2$ to $T_{10}$, increasing monotonically from $T_1$ to $T_{10}$. The composition of the magnetocaloric material and/or the slurry or paste used to form the magnetic regenerator is thus varied.

Alternatively, a single slurry container subdivided by appropriately placed dividing walls may be used. The slurries or pastes are formed so as to be suitable to enable processing of the mixtures as required to form the magnetocaloric unit. For example, the viscosities of the slurries or pastes are determined accordingly.

A tape is cast having a thickness of approximately 0.1 mm to approximately 5 mm (preferably approximately 1 mm). The tape is then cut either into plates or strips which may subsequently be rolled into cylinders. Where the strips are rolled into cylinders, the strips are cut in such a way that the magnetic transition temperature along the longitudinal axis of the cylinder varies. The cylinders are preferably formed such that the magnetic transition temperature varies monotonically along the cylinders.

A doctor blade 22 is provided to control the height of the tape as it is cast on the conveyor belt 18. Use of plural slurry containers enables the variation of the magnetic transition temperature of the final resultant product to be accurately controlled.

The tapes (or plates, cylinders etc) are then sintered (to a desired density and form stability) for 2-24 hours in a controlled environment which may be oxidizing or reducing, at a temperature from about 100 to about 1500 degrees Centigrade. The sintering results in the densification of the tapes and makes them mechanically stable and easily handled.

The actual materials used to form the slurries depend on the desired temperature span for the refrigerator. Where a refrigerator having a temperature span from 40 degrees Centigrade to zero degrees Centigrade is desired, the following compositions (e.g. one per slurry or paste) may be used:

$La_{0.67}Ca_{0.18}Sr_{0.15}MnO_3$;
$La_{0.67}Ca_{0.194}Sr_{0.136}MnO_3$;
$La_{0.67}Ca_{0.208}Sr_{0.108}MnO_3$;
$La_{0.67}Ca_{0.222}Sr_{0.108}MnO_3$;
$La_{0.67}Ca_{0.236}Sr_{0.094}MnO_3$;
$La_{0.67}Ca_{0.249}Sr_{0.081}MnO_3$;
$La_{0.67}Ca_{0.263}Sr_{0.067}MnO_3$;
$La_{0.67}Ca_{0.277}Sr_{0.053}MnO_3$;
$La_{0.67}Ca_{0.291}Sr_{0.039}MnO_3$;
$La_{0.67}Ca_{0.305}Sr_{0.025}MnO_3$.

Where a refrigerator having a temperature span from 40 degrees Centigrade to minus 20 degrees Centigrade is desired, the following compositions may be used:

$La_{0.67}Ca_{0.18}Sr_{0.15}MnO_3$;
$La_{0.67}Ca_{0.197}Sr_{0.133}MnO_3$;
$La_{0.67}Ca_{0.213}Sr_{0.117}MnO_3$;
$La_{0.67}Ca_{0.23}Sr_{0.1}MnO_3$;
$La_{0.67}Ca_{0.247}Sr_{0.083}MO_3$;
$La_{0.67}Ca_{0.263}Sr_{0.067}MnO_3$;
$La_{0.67}Ca_{0.28}Sr_{0.05}MnO_3$;
$La_{0.67}Ca_{0.297}Sr_{0.033}MnO_3$;
$La_{0.67}Ca_{0.313}Sr_{0.017}MnO_3$;
$La_{0.67}Ca_{0.33}MnO_3$.

In addition, the following materials may be used to form the magnetic regenerator.

Figure 3:
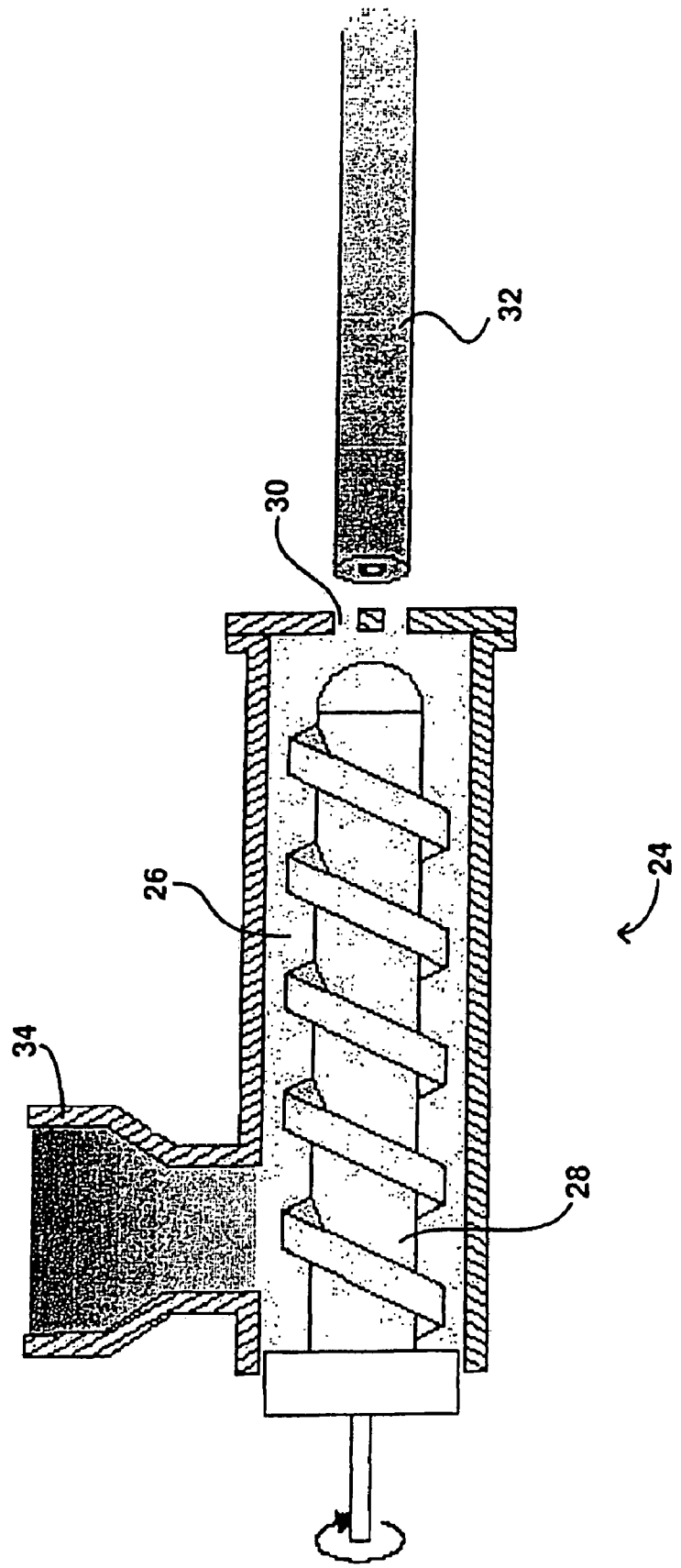
FIG. 3 shows a further example of a method of making a magnetic regenerator.

$(R,R',R'')_{1-x}(A,A',A'')_xMO_{3\pm\delta}$, where $0.15 \leq x \leq 0.5$ and $0 \leq \delta \leq 0.5$ and
R,R',R" (which may be identical) are chosen from the group La, Pr, Y, Nd
A,A',A" (which may be identical) are chosen from the group Ca, Sr, Ba, Na, K
M is chosen from the group Mn, Cr, Co FIG. 3 shows a further example of a method of making a magnetic regenerator. In the example shown in FIG. 3, an extruder 24 is provided. The extruder comprises a chamber 26 having a driver 28 arranged therein. An opening 30 is provided through which an extruded product 32 emerges during operation of the method.

A number of pastes are prepared having different compositions to ensure that they have correspondingly different magnetic transition temperatures. The different pastes are stacked in a hopper 34. The magnetic transition temperatures of the pastes increase monotonically down the stack. The sequence order of the materials in the stack may be repeated periodically to facilitate the continuous extrusion of tubes 32. As in the example described above with reference to FIG. 2, the extruded tubes are sintered for a few hours under controlled conditions.

In the case where tubes 34 are used within the magnetocaloric unit 4 shown in FIG. 1, the tubes may be arranged in a close-packed structure to provide paths for the heat transfer fluid between the hot-side heat exchanger and the cold-side heat exchanger.

Figure 4:
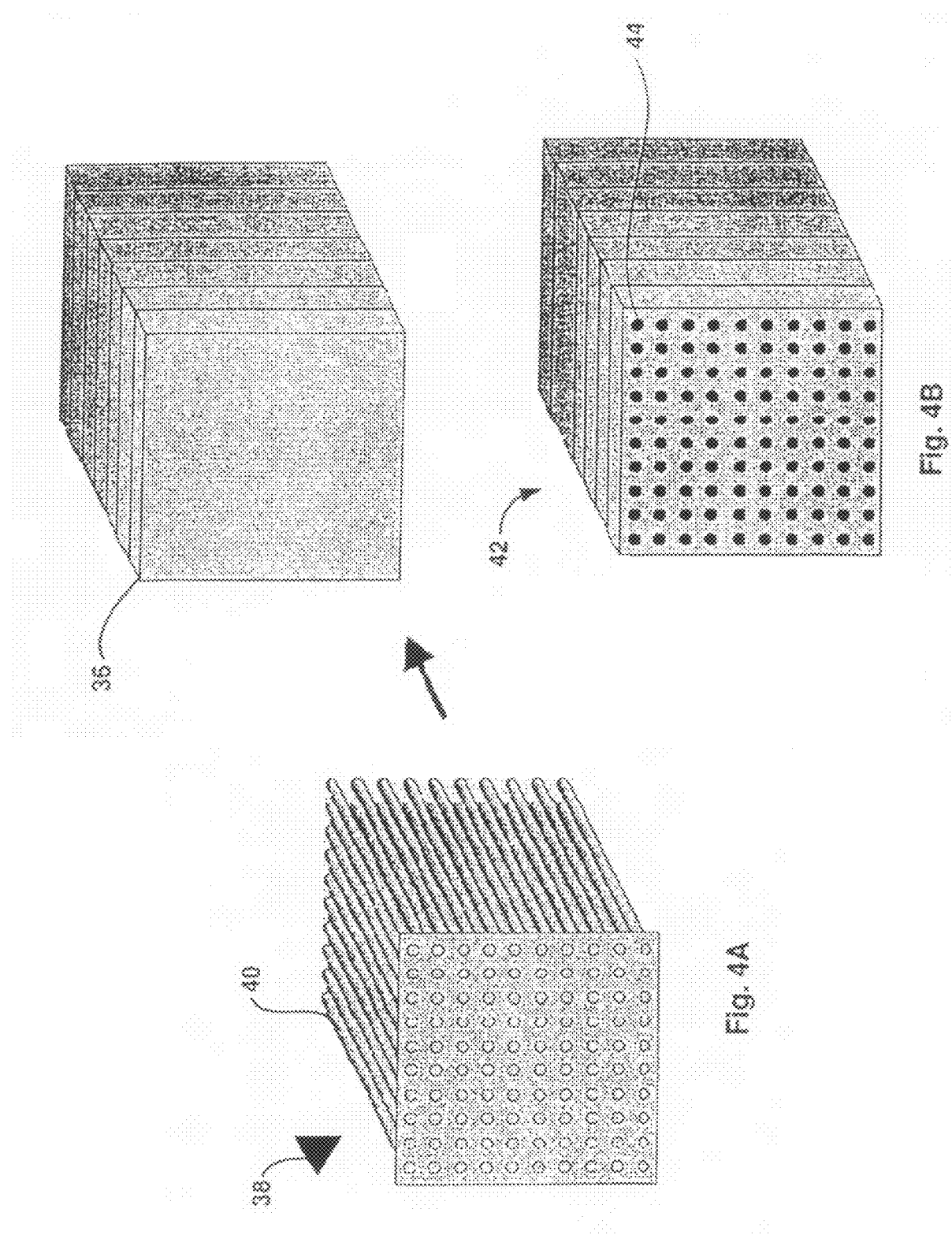
FIGS. 4A and 4B show a further example of a method of making a magnetic regenerator; and, FIG. 5 show a further example of a method of making a magnetic regenerator.

FIGS. 4A and 4B show a further example of a method of making a magnetic regenerator. In this example, again, pastes are prepared having different compositions such that they have correspondingly different magnetic transition temperatures. The pastes 36 are stacked such that the magnetic transition temperature of the stack increases monotonically down the stack. A punch 38 having prongs 40 is provided. The stack 36 is punched with the punch 38, leaving a block of material 42 (FIG. 4B) having channels 44 formed therein. The channels 44 are defined by walls having magnetic transition temperatures that vary in the direction along the longitudinal axis of the channels 44. Again, as in the example described above, the block 42 is then sintered for a few hours under controlled conditions.

Figure 5:
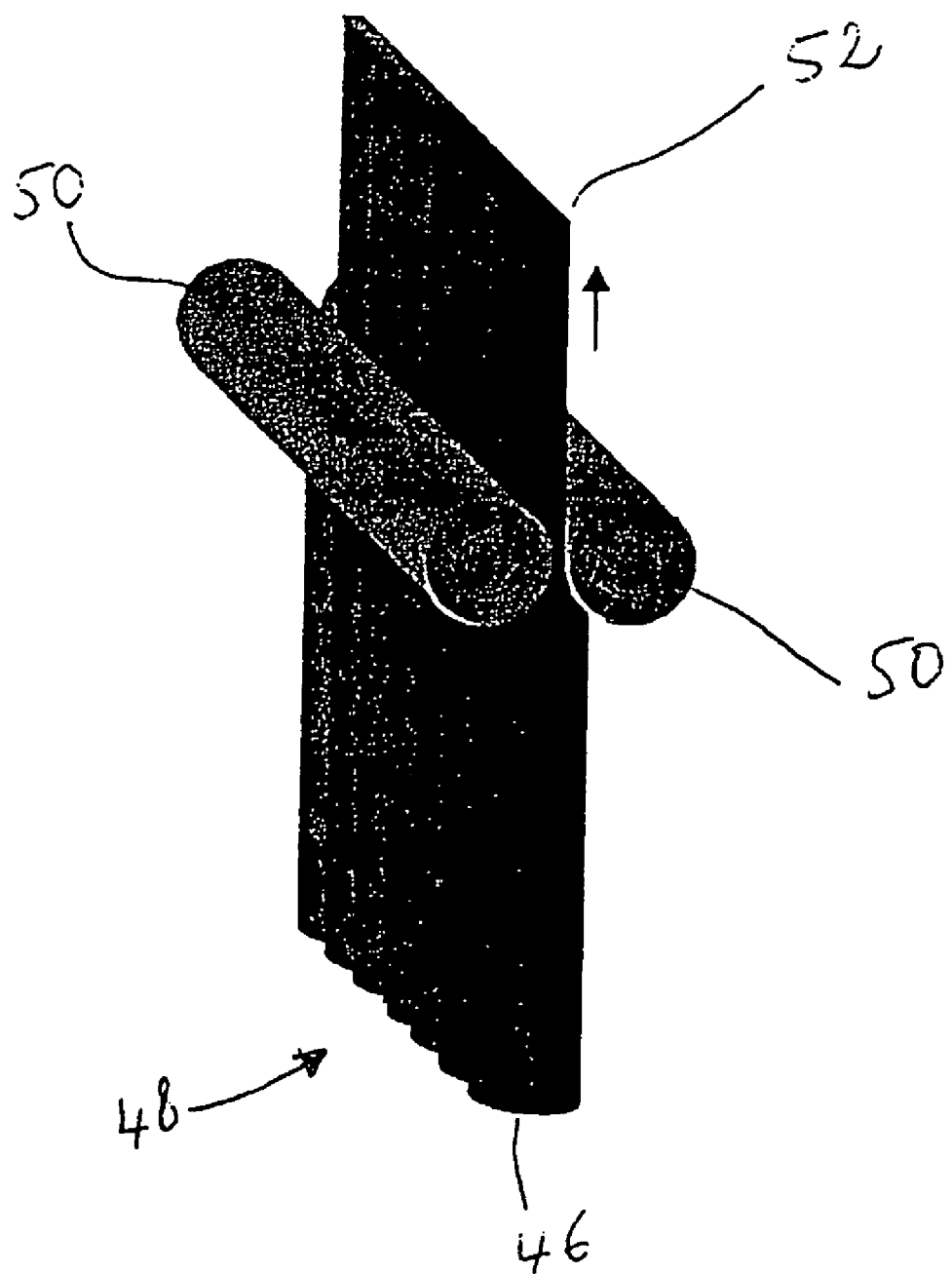

FIG. 5 shows a further example of a method of making a magnetic regenerator. In this example, again, pastes are prepared having different compositions such that they have correspondingly different magnetic transition temperatures. The pastes are formed into cylinders 46 and placed in side-by-side relationship to form a slab 48 such that the magnetic transition temperature of the slab 48 increases monotonically down the slab. The slab 48 is passed through the counter-rotating rollers 50 of a calender, thus forming a thin plate 52 with a varying magnetic transition temperature. Again, as in the examples described above, the plate 52 is then sintered for a few hours under controlled conditions.

In the examples described in each of FIGS. 2 to 5, alternative configurations for a magnetocaloric unit is made. In each case, plural channels for a heat transfer fluid are defined. Any configuration for the magnetocaloric unit may be utilised so long as plural channels for a heat transfer fluid are provided. Examples include thin plates (thickness 0.1-5 mm) stacked together with a spacing of 0.1-5 mm, concentric tubes, and small tubes having round or other (e.g. hexagonal) cross-section packed in a circular cross section. The tubes may be straight or toroidal.

Embodiments of the present invention have been described with particular reference to the examples illustrated. However, it will be appreciated that variations and modifications may be made to the examples described within the scope of the present invention.

The invention claimed is:

1. A method of making a magnetic regenerator for an active magnetic refrigerator, the method comprising:
    forming a magnetic regenerator from a slurry or a paste containing magnetocaloric material, the magnetic regenerator being formed to have paths in the form of plural discrete channels therethrough for the flow of a heat transfer fluid; and
    varying the composition of the magnetocaloric material and/or the slurry or paste so that the magnetic transition temperature of the magnetic regenerator varies along the channels.

2. A method according to claim 1, wherein the magnetocaloric material is selected from the group consisting of one or more of a metal, a metal oxide, a ceramic, or a combination thereof.

3. A method according to claim 2, wherein the magnetocaloric material is a ceramic, the method comprising:
forming mixtures of ceramic compositions having desired magnetocaloric properties;
processing the mixtures to generate component parts of the magnetic regenerator; and,
arranging the component parts to form the magnetic regenerator.

4. A method according to claim 3, comprising:
varying the composition of the ceramic material to achieve a desired variation in the magnetic transition temperature of the magnetic regenerator along the channels.

5. A method according to claim 3, wherein forming mixtures of ceramic materials having desired magnetic properties comprises:
preparing slurries or pastes of powders having variable proportions of materials, wherein the proportions of materials used are selected such that the magnetic properties of the mixtures are as desired.

6. A method according to claim 3, wherein the step of processing the mixtures to generate component parts of the magnetic regenerator comprises:
tapecasting the mixtures to obtain layers of material having desired magnetic properties; and,
sintering the layers to a desired density and form stability to obtain thin plates having a magnetic transition temperature which varies along the length of the plates.

7. A method according to claim 3, wherein the step of processing the mixtures to generate component parts of the magnetic regenerator comprises:
tapecasting the mixtures to obtain layers of material having desired magnetic properties;
forming strips of the tapecast material;
rolling the strips into tubes such that the magnetic transition temperature of the tube varies along the direction of the longitudinal axis of the tube; and,
sintering the tubes to a desired density and form stability.

8. A method according to claim 3, wherein the step of processing the mixtures to generate component parts of the magnetic regenerator comprises:
extruding the mixtures to generate a substantially tubular member having a magnetic transition temperature that varies along the longitudinal axis of the tubular member; and,
sintering the tubular member to a desired density and form stability.

9. A method according to claim 3, wherein the step of processing the mixtures to generate component parts of the magnetic regenerator comprises:
generating a block of material formed of layers each layer having a different magnetic transition temperature;
forcing plural longitudinal projections through the block thereby to form plural discrete channels in the material wherein the magnetic transition temperature varies along each of the channels; and,
sintering the block to a desired density and form stability.

10. A method according to claim 3, wherein the step of processing the mixtures to generate component parts of the magnetic regenerator comprises:
generating a slab of material formed of strips each strip having a different magnetic transition temperature;
passing the slab through a calendar to form a thin plate; and, sintering the plate to a desired high density and form stability.

11. A method according to claim 3, wherein the component parts of the magnetic regenerator are corrugated or patterned prior to sintering to increase their surface area.

12. A method according to claim 3, wherein mixtures are formed comprising the following compositions: $La_{0.67}Ca_{0.33-x}Sr_xMnO_3$, where x varies between 0 and 0.33, the magnetic transition temperature of a mixture being different for each value of x between 0 and 0.33.

13. A method according to claim 3, wherein mixtures are formed comprising the following compositions $$(R,R',R'')_{1-x}(A,A',A'')_xMO_{3\pm\delta},$$

in which
$0.15 \leq x \leq 0.5$ and $0 \leq \delta \leq 0.5$;
R, R', R" (which may be identical) are chosen from the group consisting of La, Pr, Y, Nd;
A, A', A' (which may be identical) are chosen from the group Ca, Sr, Ba, Na, K; and
M is chosen from the group consisting of Mn, Cr, Co.

14. A method of making an active magnetic refrigerator, the method comprising:
providing a magnetic regenerator manufactured according to the method of claim 1;
providing a magnet for selectively applying and removing a magnetic field to the magnetic regenerator; and
providing a heat transfer fluid driver, for driving a heat transfer fluid back and forth through the magnetic regenerator in a synchronised manner as the magnetic field is applied and removed.

15. A method according to claim 1, wherein the channels are tubes of magnetocaloric material, or are longitudinal channels formed within a block of magnetocaloric material.

16. A method according to claim 3, wherein the channels are between plates of magnetocaloric material, the separation of the plates being from 0.1 mm to 5 mm.

17. A method according to claim 16, wherein the plates have a thickness from 0.1 mm to 5 mm.

* * * * *